(12) United States Patent
Hwang et al.

(10) Patent No.: US 9,299,504 B2
(45) Date of Patent: Mar. 29, 2016

(54) PREPARATION METHOD OF LOW TEMPERATURE SINTERING ACTIVE ELECTRODE PASTE FOR DYE SENSITIZED SOLAR CELL

(71) Applicant: Korea Institute of Industrial Technology, Chungcheongnam-do (KR)

(72) Inventors: Tae Jin Hwang, Incheon (KR); Ho Hyeong Kim, Incheon (KR); Jae Young Park, Incheon (KR)

(73) Assignee: Korea Institute of Industrial Technology, Chungcheongnam-Do (KR)

( * ) Notice: Subject to any disclaimer, the term of this patent is extended or adjusted under 35 U.S.C. 154(b) by 317 days.

(21) Appl. No.: 13/788,912

(22) Filed: Mar. 7, 2013

(65) Prior Publication Data

US 2013/0333757 A1    Dec. 19, 2013

(30) Foreign Application Priority Data

Mar. 7, 2012  (KR) .................. 10-2012-0023658
Oct. 30, 2012 (KR) .................. 10-2012-0121660
Oct. 30, 2012 (KR) .................. 10-2012-0121661

(51) Int. Cl.
| | | |
|---|---|---|
| *B01D 53/56* | (2006.01) |
| *H01G 9/20* | (2006.01) |
| *C09C 1/00* | (2006.01) |
| *B82Y 30/00* | (2011.01) |

(52) U.S. Cl.
CPC ............ *H01G 9/2031* (2013.01); *C09C 1/0084* (2013.01); *B82Y 30/00* (2013.01); *H01G 9/2059* (2013.01); *Y02E 10/542* (2013.01)

(58) Field of Classification Search
CPC ...... H01G 9/20; H01G 9/2031; H01L 51/005; H01L 51/0051–51/0059; H01L 51/0076; H01L 51/0077; H01L 51/0084; H01L 51/0086; H01L 51/4213; H01L 51/422; H01L 51/4226; H01L 51/4233; C09C 1/0084
USPC ........................................................ 136/263
See application file for complete search history.

(56) References Cited

U.S. PATENT DOCUMENTS

2009/0324472 A1 * 12/2009 Fu et al. .................. 423/239.1

FOREIGN PATENT DOCUMENTS

| CN | 101692470 | * | 4/2010 |
| KR | 1020110075329 A | | 6/2011 |

OTHER PUBLICATIONS

Tae et al., A Strategy to Increase the efficiency of the Dye Sensitized TiO2 Photoexcitation of Dye-to-TiO2 Charge-Transfer Bands, Journal of Physical Chemistry B, vol./issue 109, pp. 22513-22522 (2005).*

(Continued)

*Primary Examiner* — Jayne Mershon
(74) *Attorney, Agent, or Firm* — Cesari and McKenna LLP

(57) ABSTRACT

The present invention relates to a method for preparing titanium dioxide paste for dye sensitized solar cell, and more specifically a method for preparing titanium dioxide paste fir dye sensitized solar cell, which is curable at a low temperature and is able to form a uniform coating layer and exhibits relatively high energy conversion efficiency. The present invention also relates to a method for preparing low temperature curable paste which requires no separate dye adsorption process or can improve energy conversion efficiency by adding dye or metal precursor in advance.

22 Claims, 13 Drawing Sheets

(56) References Cited

OTHER PUBLICATIONS

Wang et al., Comparison of Electron Transfer Dynamics in Molecule-to-Nanoparticle and INtramolecular Charge Transfer Complexes, Journal of Physical Chemistry B, vol./Issue 107, pp. 9434-9440 (2003).*

36th International conference and exposition on Advanced Ceramics and Composites, Organized by The American Ceramic Society and The American Ceramic Society's Engineering Ceramics Division, Jan. 22-27, 2012, Hilton Daytona Beach Resort and Ocean Center, Daytona Beach Florida, USA, 24 pages.

2012 Spring conference of the Korean Institute of Metals and Materials, 2012, 21 pages.

Material Science and Technology 2012 Conference & Exhibition, Oct. 7-11, 2012, Pittsburg, Pennsylvania USA, 38 pages.

* cited by examiner

Figure 15

▷ ITO glass

| Sample | FF | Eff | Voc | Isc | Pmax | Vmp | Imp | Area |
|---|---|---|---|---|---|---|---|---|
| 8time_ITO cell_1 | 0.72 | 3.63 | 0.68 | 2.69 | 1.31 | 0.53 | 2.48 | 0.36 |
| 8time_ITO cell_2 | 0.72 | 4.13 | 0.68 | 3.03 | 1.49 | 0.53 | 2.82 | 0.36 |
|  | 0.72 | 3.88 | 0.68 | 2.86 | 1.40 | 0.53 | 2.65 | 0.36 |
| 10time_ITO cell_1 | 0.71 | 4.41 | 0.67 | 3.30 | 1.59 | 0.54 | 2.92 | 0.36 |
| 10time_ITO cell_2 | 0.74 | 4.02 | 0.68 | 2.89 | 1.45 | 0.56 | 2.58 | 0.36 |
| 10time_ITO cell_3 | 0.77 | 4.11 | 0.68 | 2.86 | 1.48 | 0.54 | 2.72 | 0.36 |
|  | 0.74 | 4.18 | 0.68 | 3.02 | 1.50 | 0.55 | 2.74 | 0.36 |
| 15time_ITO cell_1 | 0.68 | 4.44 | 0.71 | 3.31 | 1.60 | 0.53 | 3.03 | 0.36 |
| 15time_ITO cell_2 | 0.72 | 4.49 | 0.68 | 3.34 | 1.62 | 0.54 | 2.97 | 0.36 |
| 15time_ITO cell_3 | 0.74 | 4.92 | 0.68 | 3.53 | 1.77 | 0.55 | 3.21 | 0.36 |
|  | 0.71 | 4.62 | 0.69 | 3.39 | 1.66 | 0.54 | 3.07 | 0.36 |

▷ ITO/PEN film

| Sample | FF | Eff | Voc | Isc | Pmax | Vmp | Imp | Area |
|---|---|---|---|---|---|---|---|---|
| 8time_PEN cell_1 | 0.80 | 2.57 | 0.54 | 2.12 | 0.92 | 0.49 | 1.89 | 0.36 |
| 8time_PEN cell_2 | 0.66 | 2.43 | 0.60 | 2.23 | 0.88 | 0.46 | 1.92 | 0.36 |
| 8time_PEN cell_2-re | 0.84 | 2.63 | 0.48 | 2.36 | 0.95 | 0.47 | 2.01 | 0.36 |
|  | 0.77 | 2.54 | 0.54 | 2.24 | 0.92 | 0.47 | 1.94 | 0.36 |
| 10time_PEN cell_1 | 0.67 | 2.56 | 0.60 | 2.30 | 0.92 | 0.46 | 1.99 | 0.36 |
| 10time_PEN cell_1-re | 0.64 | 2.25 | 0.60 | 2.12 | 0.81 | 0.43 | 1.87 | 0.36 |
|  | 0.65 | 2.41 | 0.60 | 2.21 | 0.87 | 0.45 | 1.93 | 0.36 |
| 12time_PEN cell_1 | 0.78 | 2.91 | 0.58 | 2.33 | 1.05 | 0.50 | 2.08 | 0.36 |
| 12time_PEN cell_2 | 0.67 | 2.82 | 0.66 | 2.31 | 1.02 | 0.48 | 2.12 | 0.36 |
|  | 0.72 | 2.87 | 0.62 | 2.32 | 1.03 | 0.49 | 2.10 | 0.36 |

PREPARATION METHOD OF LOW TEMPERATURE SINTERING ACTIVE ELECTRODE PASTE FOR DYE SENSITIZED SOLAR CELL

CROSS REFERENCE TO RELATED APPLICATIONS

This application claims the benefit of Korean Application No. 10-2012-0023658, filed on Mar. 7, 2012, Korean Application No. 10-2012-0121660, filed on Oct. 30, 2012, and Korean Application No. 10-2012-0121661, filed on Oct. 30, 2012. The contents of all three applications are hereby incorporated by reference in their entirety.

TECHNICAL FIELD

The present invention relates to a method for preparing titanium dioxide paste for dye sensitized solar cell, and more specifically a method for preparing titanium dioxide paste for dye sensitized solar cell, which is curable at a low temperature and is able to form a uniform coating layer and exhibits relatively high energy conversion efficiency. The present invention also relates to a method for preparing low temperature curable paste which requires no separate dye adsorption process or can improve energy conversion efficiency by adding dye or metal precursor in advance.

BACKGROUND ART

Dye sensitized solar cell (DSC or DSSC) is pollution-tree clean technology which generates electric power by converting light energy into electrical energy as application of the principle of photosynthesis in plants. It has emerged as a prime alternative to overcome limits of silicon solar cell which occupies most of the current solar cell market.

The characteristics of dye sensitized solar cell are the capability of realizing the various colors by using the variety of dyes, and using effectively the spectrum of sunlight.

In addition, dye sensitized solar cell is formed of porous photocathode layer and therefore exhibits relatively high power generation efficiency for scattered light as well as direct sunlight, resulting in the large amount of power generation.

Dye sensitized solar cell has the structure of nanoparticles adsorbed to transparent electrodes coating a transparent glass, herein the nanoparticle is semiconductor substance, mainly $TiO_2$. The nanoparticle is coated with dye polymer as mono-layer. Principle is that the dye absorbs light, generating electrons, and generated electrons are carried to electrode by nanoparticles resulting in the electric current flow.

In general, electrode of dye sensitized solar cell is prepared by preparing $TiO_2$ nanoparticles, preparing $TiO_2$ nanoparticle paste by adding the solvent to the $TiO_2$ nanoparticles, preparing nanoporous $TiO_2$ layer by applying the $TiO_2$ nanoparticle paste on the substrate and sinitering by heat treatment at the high temperature of around 400-500, and then depositing dye layer on the $TiO_2$ layer by dipping the substrate in dye.

Preparation method of $TiO_2$ nanoparticle based on sol-gel process is the most typical and effective method which prepares nano-size titanium dioxide economically due to a simple process. Nano-size $TiO_2$ can be prepared as the particles with a variety of forms such as spheres, rods, tubes, wires, platelets, porous and aerogel by sol-gel method. The characteristics of prepared titanium dioxide are known to be significantly affected by pH, presence of catalyst, temperature, and the properties of precursor and the like.

$TiO_2$ sol is prepared by dispersing titanium isopropoxide and titanium butoxide of appropriate molar ratio in IPA and adding the mixed solution of $H_2O$, $HNO_3$, IPA followed by reacting. $TiO_2$ sol, prepared as mentioned above, requires the high temperature calcination by high-temperature heat treatment in order to form nanoporous as described above. A high temperature calcination method has high energy cost and accompanies inconvenience in the process.

In addition, the conventional method of preparing electrode for dye sensitized solar cell requires separate dye adsorption process after deposition of $TiO_2$ nanoparticles and therefore accompanies complexity of the process.

In addition, in order to increase the power generation efficiency of the solar cells, it is necessary to improve energy conversion efficiency of titanium dioxide paste for dye sensitized solar cell.

Therefore, the method for preparing low temperature curable $TiO_2$ nanoparticle paste is required. Also, the method for preparing titanium dioxide paste for dye sensitized solar cell, which can improve energy conversion efficiency and requires no separate dye adsorption process, is required.

Under this background, the present inventors identified that low temperature curable paste which is capable of coating without micro-fissure can be prepared by forming —O—Ti—O— network between titanium dioxide nanoparticle and titanium dioxide precursor by inducing the hydrolysis of titanium dioxide nanoparticle and titanium dioxide precursor by mixing titanium dioxide precursor, which can act as a binder, to titanium dioxide nanoparticles dispersed in a solvent at a constant molar ratio to complete the present invention. In addition, it is verified that low temperature curable paste which requires no separate dye adsorption process or can improve energy conversion efficiency by adding dye or metal precursor in advance can be prepared.

DISCLOSURE

Technical Problem

The objective of the present invention is to provide a method for preparing titanium dioxide paste for dye sensitized solar cell, which is curable at a low temperature, is able to form a uniform coating layer and exhibits relatively high energy conversion efficiency.

Another objective of the present invention is also to provide a titanium dioxide paste for dye sensitized solar cell prepared by the above preparation method.

Another objective of the present invention is also to provide a method of preparing electrode for dye sensitized solar cell using the above titanium dioxide paste.

Another objective of the present invention is also to provide an electrode for dye sensitized solar cell prepared by the above preparation method.

Another objective of the present invention is also to provide a dye sensitized solar cell containing the above electrode.

Technical Solution

Accordingly, the present invention provides a method for preparing titanium dioxide paste comprising the following steps of:

1) adding titanium dioxide nanoparticle to water, alcohol, or mixed solvent thereof (Step 1);

2) dispersing the resultant mixture with ultrasound (Step 2);

3) adding titanium dioxide precursor to the dispersed solution (Step 3); and 4) stirring the resultant mixture (Step 4).

In the present invention, the above titanium dioxide paste can be used for dye sensitized solar cell.

The above Step 1 of adding titanium dioxide nanoparticle to water, alcohol, or mixed solvent thereof is to add titanium dioxide nanoparticle, which is the essential component of paste, to water, alcohol, or mixed solvent thereof which is solvent.

In the present invention; it is preferable to use solvent which can disperse titanium dioxide nanoparticle, dissolve titanium dioxide precursor and can be removed at the low temperature which is lower than 120° C. Accordingly, the present invention is characterized in that water, alcohol, or mixed solution thereof is used as described above. Available alcohol may be, but is not limited to, ethanol, methanol, propanol, or butanol.

As used herein, the term "titanium dioxide nanoparticle" refers to a titanium dioxide particle of nano size. Specifically, titanium dioxide nanoparticle in the present invention may be, but is not limited to, particle of 10 nm to 100 nm size. In one example in the present invention, titanium dioxide nanoparticle of 20 nm size was used.

In the present invention, commercially available titanium dioxide nanoparticle may be used after purchase or titanium dioxide nanoparticle which is directly prepared using conventional sol-gel method or hydrothermal method may be used.

The amount of added titanium dioxide nanoparticle is preferably 7 to 13%, preferably 9 to 11%, and most preferably 10% of total amount of whole full titanium dioxide paste by weight. While general content of titanium dioxide nanoparticle in the commercial paste to apply to screen printer or doctor blade is 15 to 17% by weight, the above range of content is preferable in the case of paste in the present invention for proper viscosity to apply to dip coating.

In the present invention, dye or metal precursor can be added additionally in Step 1.

In one embodiment, if dye is additionally added, Step 1 may comprise the following steps of:

preparing dye solution by dissolving dye in alcohol (Step a1);

preparing mixed solution by adding water to the above solution (Step b1); and adding titanium dioxide nanoparticle to the resultant mixed solution (Step c1).

The above Step a1 of preparing dye solution by dissolving dye in alcohol is to prepare dye solution by dissolving dye in alcohol which is solvent in advance.

As used herein, the term "dye" refers to a substance that can absorb light and generate electrons in dye sensitized solar cell.

In the present invention, dye can be stably present in the paste due to chemical bond by condensation reaction of ligand thereof with —O—Ti—O— network which is formed by titanium dioxide nanoparticle and titanium isopropoxide in titanium dioxide paste, and therefore can form long-term stable paste.

In the present invention, any dye which can be used for dye-sensitized solar cell can be used. Dye may be ruthenium-based organo-metallic compound, organic compound, or quantum dot inorganic compound. The specific example of ruthenium-based organo-metallic compound dye may be, but is not limited to, N3, N719, N749, and Z907. The organic compound dye may be, but is not limited to, coumarin, porphyrin, xanthene, riboflavin, triphenylmethane or derivatives thereof. Specifically, the example of organic compound is D205, NKX-2311 and NKX-2677. Specific example of quantum dot inorganic compound dye is, but not limited to, InP, CdSe, CdS, CdTe, PbS, and PbSe.

In the present invention, the concentration of dye may be 0.3 to 3 mM, and can vary depending on the dye used. If the concentration of dye is lower than lower limit, dye content is too low to absorb enough visible light causing drawback of decrease of energy conversion efficient, lithe concentration of dye is higher than upper limit, dye content is so high that resistance of unit cell decreases causing a short circuit.

The above Step b1 of preparing mixed solution by adding water to the above solution is to prepare mixed solution by adding water to the alcohol solution in which dye is dissolved.

In the present invention, water is necessary component when titanium dioxide nanoparticle which is added later reacts with titanium dioxide precursor and therefore the amount of added water needs to be controlled within the certain extent. It is desirable that the amount of added water is 2 to 4 mol per 1 mol of titanium dioxide precursor.

The above Step c1 of adding titanium dioxide nanoparticle to the resultant mixed solution is to add titanium nanoparticle, which is the essential component of paste, to the mixed solution of alcohol and water in which dye is dissolved.

In another embodiment, if metal precursor is additionally added, Step 1) may comprise the following steps of:

preparing metal precursor solution by dissolving metal precursor in alcohol (Step a2);

preparing mixed solution by adding water to the above solution (Step b2); and adding titanium dioxide nanoparticle to the resultant mixed solution (Step c2).

The above Step a2 of preparing metal precursor solution by dissolving metal precursor in alcohol is to prepare precursor solution by dissolving metal precursor for formation of metal nanoparticle in alcohol which is solvent.

As used herein, the term "metal precursor" refers to a metal compound which can be grown to the metal nanoparticle.

In the present invention, the metal precursor can grow into nanoparticle through photo reduction reaction by treating with UV or gamma rays, etc.

Available metal precursor in the present invention may be, but is not limited to, precursor of gold (Au), platinum (Pt) or palladium (Pd). Specifically, precursor of gold such as $AuCl_3$ and $HAuCl_4$ can be used.

In the present invention, the concentration of metal precursor may be 0.3 to 10 mM, and can vary depending on the metal precursor used if the concentration of metal precursor is lower than lower limit, metal precursor content is too low to absorb enough visible light causing drawback of decrease of energy conversion efficient. If the concentration of metal precursor is higher than upper limit, metal precursor content is so high that resistance of unit cell decreases causing a short circuit.

The above Step b2 of preparing mixed solution by adding water to the above solution is to prepare mixed solution by adding water to the alcohol solution in which metal precursor is dissolved.

In the present invention, water is necessary component when titanium dioxide nanoparticle which is added later reacts with titanium dioxide precursor and therefore the amount of added water needs to be controlled within the certain extent. It is desirable that the amount of added water is 2 to 4 mol per 1 mol of titanium dioxide precursor.

The above Step c2 of adding titanium dioxide nanoparticle to the resultant mixed solution is to add titanium nanoparticle, which is the essential component of paste, to the mixed solution of alcohol and water in which metal precursor is dissolved.

The above Step 2 of dispersing the resultant mixture with ultrasound is to disperse with ultrasound in order to obtain homogeneous dispersed solution of titanium dioxide nanoparticles.

Ultrasonic dispersion in Step 2 is performed by repeating ultrasound treatment and cooling at regular intervals so that evaporation of the solvent can be prevented.

Preferably, Step 2 can be performed by repeating ultrasonic treatment of the mixture for 5-15 minutes followed by cooling for 1-5 minutes by 5 to 15 times.

The intensity of ultrasound may be 10 to 30 kHz.

The above Step 3 of adding titanium dioxide precursor to the dispersed solution is to add titanium dioxide precursor, which can play a role as binder, to dispersed solution of titanium dioxide nanoparticle.

In the present invention, titanium dioxide precursor plays a role as binder between titanium dioxide nanoparticles by forming —O—Ti—O— network through reaction with titanium dioxide nanoparticle and water.

As titanium dioxide precursor in the present invention, titanium alkoxide, titanium chloride ($TiCl_4$), or a combination thereof can be used. Available titanium alkoxide may be, hut not limited to, titanium isopropoxide (TIPP), titanium methoxide, titanium ethoxide, titanium tetra butoxide, titanium tetra-isobutoxide, titanium tetra-tert butoxide or a combination thereof. In one example of the present invention, titanium isopropoxide, which is easy to handle, was used.

The amount of added titanium dioxide precursor preferably is 0.05 to 0.2 mol, and most preferably 0.1 mol per 1 mol of titanium dioxide nanoparticle. If the amount of added titanium dioxide precursor is less that 0.05 mol, adhesivity between titanium dioxide nanoparticles can be weakened and if the amount of added titanium dioxide precursor is more than 0.2 mol, the porosity can be reduced due to the cohesion between titanium dioxide nanoparticles.

Titanium dioxide precursor reacts with titanium dioxide nanoparticle along with water and therefore the amount of added water needs to be controlled within the certain extent. It is desirable that the amount of added water is 2 to 4 mol per 1 mol of titanium dioxide precursor.

The above Step 4 of stirring the resultant mixture is to induce the reaction of titanium dioxide nanoparticle, titanium dioxide precursor and water in the mixture by stirring.

It is desirable to stirring in Step 4 is performed for 3 to 7 hours in order for sufficient reaction of titanium dioxide nanoparticle, titanium dioxide precursor and water.

Further, the present invention also provides titanium dioxide paste which is prepared according to the above preparation method.

In the present invention, the titanium dioxide paste can be used of dye sensitized solar cell.

Further, the present invention also provides a method for preparing electrode for dye sensitized solar cell, comprising the following steps of:

1) preparing electrode-treated substrate (Step 1);
2) coating the top of the electrode with titanium dioxide paste prepared according to the above preparation method (Step 2);
3) forming a titanium dioxide layer by curing the coated substrate at 100 to 140° C. (Step 3); and
4) adsorbing dye on the titanium dioxide layer (Step 4).

The above Step 1 of preparing electrode-treated substrate is to prepare electrode-treated substrate prior to coating titanium dioxide paste.

Available material for electrode comprises, but is not limited to, Indium-tin oxide (ITO).

Available substrate comprises, but is not limited to, glass substrate and polyethylene naphthalate (PEN) substrate.

The above Step 2 of coating the top of the electrode with titanium dioxide paste prepared according to the above preparation method is to coat the electrode of substrate with titanium dioxide paste.

Coating of titanium dioxide paste can be performed through dip coating.

The above Step 3 of forming a titanium dioxide layer by curing the coated substrate at 100 to 140° C. is to form a titanium dioxide layer by curing the titanium dioxide paste coated layer at low temperature.

By using titanium dioxide paste which is prepared according to the preparation method in the above, a method for preparing electrode for dye sensitized solar cell in the present invention enables to form a titanium dioxide layer through curing at low temperature of 100 to 140° C., different from conventional calcination which requires heat treatment of 400 to 500° C.

The above Step 4 of adsorbing dye on the titanium dioxide layer is to adsorb dye, which can absorb light and generate electrons, on the titanium dioxide layer.

As used herein, the term "dye" refers to a substance that can absorb light and generate electrons in dye sensitized solar cell.

In the present invention, any dye which can be used for dye-sensitized solar cell can be used Dye may be ruthenium-based organo-metallic compound, organic compound, or quantum dot inorganic compound. The specific example of ruthenium-based organo-metallic compound dye may be but is not limited to, N3, N719, N749, and Z907. The organic compound dye may be, but is not limited to, coumarin, porphyrin, xanthene, riboflavin, triphenylmethane or derivatives thereof. Specifically, the example of organic compound is D205, NKX-2311 and NKX-2677. Specific example of quantum dot inorganic compound dye is, but not limited to, InP, CdSe, CdS, CdTe, PbS, and PbSe.

The adsorption of dye can be done by immersing the substrate on which titanium dioxide layer was funned in the dye solution for a certain period of time. The desirable immersion time is approximately 24 hours.

Further, the present invention also provides, in the case when titanium dioxide paste with addition of extra dye is used, a method for preparing electrode for dye sensitized solar cell comprising the following steps of:

1) preparing electrode-treated substrate (Step 1);
2) coating the top of the electrode with titanium dioxide paste with addition of dye prepared according to the above preparation method (Step 2); and
3) forming a titanium dioxide layer adsorbed with dye by curing the coated substrate at 100 to 140° C. (Step 3);

The above Step 1) to Step 3) can be perform identically as the Step 1) to Step 3) of the above-mentioned method for preparing the electrode for dye sensitized solar cell.

The method for preparing the electrode for dye sensitized solar cell has an advantage of simpler process without required separate dye adsorption process by using titanium dioxide paste containing dye.

Further, the present invention also provides, in the case when titanium dioxide paste with addition of extra metal precursor is used, a method for preparing electrode for dye sensitized solar cell, comprising the following steps of:

1) preparing electrode-treated substrate (Step 1);
2) coating the top of the electrode with titanium dioxide paste with addition of metal precursor prepared according to the above preparation method (Step 2);

3) treating the coated substrate with UV or gamma ray (Step 3);

4) forming a titanium dioxide layer by curing the coated substrate at 100 to 140° C. (Step 4); and 5) adsorbing dye on the titanium dioxide layer (Step 5).

The above Step 1) to Step 2) can be perform identically as the Step 1) to Step 2) of the above-mentioned method for preparing the electrode for dye sensitized solar cell. Also, the above Step 4) and Step 5) can be perform identically as the Step 3) to Step 4) of the above-mentioned method for preparing the electrode for dye sensitized solar cell.

The method for preparing the electrode for dye sensitized solar cell comprises Step 3) in order to induce photo reduction reaction of metal precursor by using titanium dioxide paste containing metal precursor.

The above Step 3 of treating the coated substrate with UV or gamma ray is to induce photo reduction reaction of metal precursor by treating the titanium dioxide coated layer paste with UV or gamma ray.

In the present invention, the UV or gamma ray treatment time may be 20 seconds to 1 minute. If the treatment time is shorter than the lower limit, growth of metal nanoparticles is not sufficient causing decrease in energy conversion efficient, and if the treatment time is longer than the upper limit causing thermal deformation of the flexible substrate such as polyethylene naphthalate.

Further, the present invention also provides the electrode for dye sensitized solar cell which is prepared according to the above preparation method.

Further, the present invention also provides the sensitized solar cell containing the above electrode.

The configuration of the present invention will be described in detail with reference to the accompanying Figures.

FIG. 1 is the flow diagram to represent the method for preparing titanium dioxide paste as one embodiment of the present invention.

As shown in FIG. 1, the low temperature curable titanium dioxide paste can be prepared through the steps of preparing the mixed solvent of ethanol and water followed by adding titanium dioxide nanoparticle to the resultant mixed solvent (Step 1); dispersing the mixture with ultrasound (Step 2); adding titanium isopropoxide to the dispersed solution (Step 3); and stirring the resultant mixture (Step 4);

In the present invention, titanium dioxide paste with increased adhesivity between titanium dioxide nanoparticles can be prepared by formation of —O—Ti—O— network between titanium dioxide nanoparticle and titanium isopropoxide through hydrolysis and condensation reaction of titanium dioxide nanoparticle with titanium isopropoxide and water as represented by Reaction Equation 1.

$TiO_2 + nTi(OR)_4 + 2nH_2O \rightarrow (n+1)TiO_2 + 4nROH$ [Reaction Equation 1]

FIG. 2 illustrates schematically the process of formation of —O—Ti—O— network between titanium dioxide nanoparticle and titanium isopropoxide through hydrolysis and condensation reaction of titanium dioxide nanoparticle, titanium isopropoxide and water as represented by Reaction Equation 1.

FIG. 3 illustrates the microstructure of titanium dioxide coated layer of the electrode which is prepared using the above titanium dioxide paste.

Titanium dioxide paste in the present invention can form the porous layer of anatase type titanium dioxide between titanium dioxide nanoparticles although cured at low temperature of 100 to 140° C.

FIG. 4 is the flow diagram to illustrate each step of the method for preparing titanium dioxide paste containing dye for dye sensitized solar cell in the present invention.

As shown in FIG. 4, the low temperature curable titanium dioxide paste containing dye in the present invention can be prepared through the steps of preparing dye solution by dissolving dye in 1-butanol (Step 1); preparing the mixed solution by adding water to the above solution (Step 2); adding titanium dioxide nanoparticle to the resultant mixed solution (Step 3); dispersing the mixture with ultrasound (Step 4); adding titanium isopropoxide to the dispersed solution (Step 5); and stirring the resultant mixture (Step 6);

In the present invention, titanium dioxide paste with increased adhesivity between titanium dioxide nanoparticles can be prepared by formation of —O—Ti—O— network between titanium dioxide nanoparticle and titanium isopropoxide through hydrolysis and condensation reaction of titanium dioxide nanoparticle with titanium isopropoxide and water as represented by Reaction Equation 1.

$TiO_2 + nTi(OR)_4 + 2nH_2O \rightarrow (n+1)TiO_2 + 4nROH$ [Reaction Equation 1]

In addition, dye, in the present invention, can form a network by forming the chemical bond through condensation reaction of ligand of dye with —O—Ti—O— network formed by titanium dioxide nanoparticle and titanium isopropoxide in titanium dioxide paste.

FIG. 5 illustrates schematically the process of formation of network of ruthenium-based organo-metallic compound dye by forming the chemical bond through condensation reaction of hydroxyl group of ruthenium-based organo-metallic compound dye with —O—Ti—O— network formed by titanium dioxide nanoparticle and titanium isopropoxide in titanium dioxide paste.

FIG. 6 illustrates schematically the process of formation of network of organic compound dye by forming the chemical bond through condensation reaction of carboxyl group of organic compound dye with —O—Ti—O— network formed by titanium dioxide nanoparticle and titanium isopropoxide in titanium dioxide paste.

FIG. 7 illustrates schematically the process of formation of network of quantum dot inorganic compound dye by forming the chemical bond through condensation reaction of carboxyl group of quantum dot inorganic compound dye with —O—Ti—O— network formed by titanium dioxide nanoparticle and titanium isopropoxide in titanium dioxide paste.

FIG. 8 illustrates schematically the microstructure of titanium dioxide coated layer of the electrode which is prepared using the above titanium dioxide paste containing dye.

As shown in FIG. 8, titanium dioxide coated layer of the electrode prepared using titanium dioxide paste containing dye in the present invention can form one stable phase by homogeneous adsorption of dye on the porous layer formed by primary titanium dioxide nanoparticles formed by titanium dioxide nanoparticles and titanium isopropoxide.

As another embodiment, FIG. 9 is the flow diagram to illustrate each step of the method for preparing titanium paste containing metal precursor for dye sensitized solar cell in the present invention.

As shown in FIG. 9, the low temperature curable titanium dioxide paste containing metal precursor in the present invention can be prepared through the steps of preparing metal precursor solution by dissolving metal precursor in ethanol (Step 1); preparing the mixed solution by adding water to the above solution (Step 2); adding titanium dioxide nanoparticle to the resultant mixed solution (Step 3); dispersing the mixture with ultrasound (Step 4); adding titanium isopropoxide to the dispersed solution (Step 5); and stirring the resultant mixture (Step 6).

In the present invention, titanium dioxide paste with increased adhesivity between titanium dioxide nanoparticles can be prepared by formation of —O—Ti—O— network between titanium dioxide nanoparticle and titanium isopropoxide through hydrolysis and condensation reaction of titanium dioxide nanoparticle with titanium isopropoxide and water as represented by Reaction Equation 1.

TiO$_2$+$n$Ti(OR)$_4$+2$n$H$_2$O→($n$+1)TiO$_2$+4$n$ROH   [Reaction Equation 1]

FIG. 10, the schematic diagram illustrates the process of growth reaction of metal precursor to metal nanoparticle in the present invention.

First, the water which is present in titanium dioxide paste coated layer containing the dissolved metal precursor is decomposed by radiation of UV or gamma ray and generates electrons. Metal cation will be reduced to the metal due to the generated electrons, the reduced metal agglomerates together to form metal nanoparticle nucleus, and the reduced metal keeps combining to the formed nucleus to grow into the metal nanoparticle.

FIG. 11 is the schematic diagram to illustrate the process of growth reaction of gold precursor, which is used as metal precursor in the present invention, to gold nanoparticle by combining the surface on titanium dioxide nanoparticle.

First, as represented by Reaction Equation 2, the water which is present in titanium dioxide paste coated layer containing the dissolved metal precursor is decomposed by radiation of UV or gamma ray and generates electrons (e$^-$), H., and OH.. Then, as represented by Reaction Equation 3, generated OH. or H. reacts with —OH group which is present on the surface of titanium dioxide nanoparticle to generate radicals (R.) on the surface of titanium dioxide nanoparticle. And then, as represented by Reaction Equation 4, electrons (e–) generated in the paste, H., and radicals (R.) generated on the surface of titanium dioxide nanoparticle react with gold (Au) cations leads to the reduction of gold (Au) cations to gold (Au) followed by agglomeration of the reduced gold (Au) to form gold (Au) nanoparticle nucleus. The reduced gold (Au) keeps combining to the formed nucleus to grow into gold (Au) nanoparticle.

H$_2$O→e$^-$, H., OH., etc.   [Reaction Equation 2]

R—OH+OH.→R.—OH+H$_2$O

R—OH+H.→R.—OH+H$_2$   [Reaction Equation 3]

Au$^{+3}$+3e$^-$→Au

Au$^{3+}$+3H.→Au+3H$^+$

Au$^{3+}$+3R.—OH→Au+3R—O+3H$^+$   [Reaction Equation 4]

FIG. 12 represents the electron injection and recombination between metal nanoparticles and titanium dioxide nanoparticles. Since electronegativity and electron affinity of metal nanoparticles are superior to those of titanium dioxide nanoparticles, recombination of generated electrons and holes is inhibited and pair life time is increased so that large amount of generated electrons is able to move to the electrode, which improves the energy conversion efficiency.

Effect of Invention

The present invention has an effect in preparing low temperature curable paste for dye sensitized solar cell which is able to form a homogeneous coating layer and exhibits relatively high energy conversion efficiency by inducing the hydrolysis of titanium dioxide nanoparticle and titanium dioxide precursor by mixing titanium dioxide precursor, which can act as a binder, to titanium dioxide nanoparticles dispersed in a solvent at a constant molar ratio. Further, the present invention has an effect in preparing low temperature curable paste which requires no separate dye adsorption process or can improve energy conversion efficiency by adding dye or metal precursor in advance.

Wherein, (a) represents titanium dioxide paste prepared by general dispersion method, and (b) represents titanium dioxide paste prepared by dispersing using ultrasonic stirring method.

Figure 14:
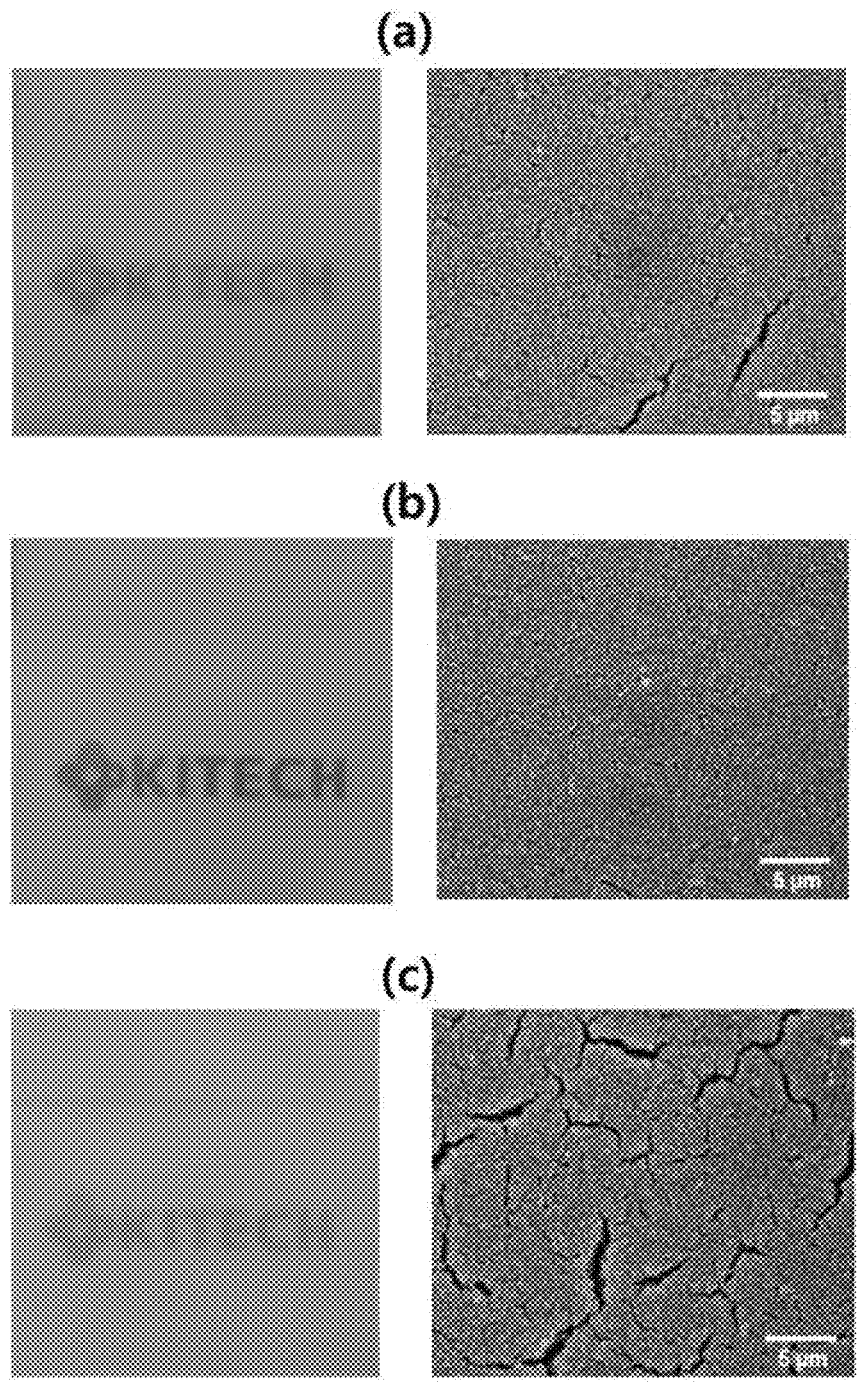

FIG. 14 represents the appearance of the surface of titanium dioxide coating according to the amount of added TIPP and Observation result thereof with a scanning electron microscope (SEM). Wherein, (a), (b) and (c) represent the surface of coating using titanium dioxide paste of Example 1, Example 2, and Example 3, respectively.

FIG. 15 shows the results of determining energy conversion efficiency of titanium dioxide paste according to the substrate.

Figure 16:
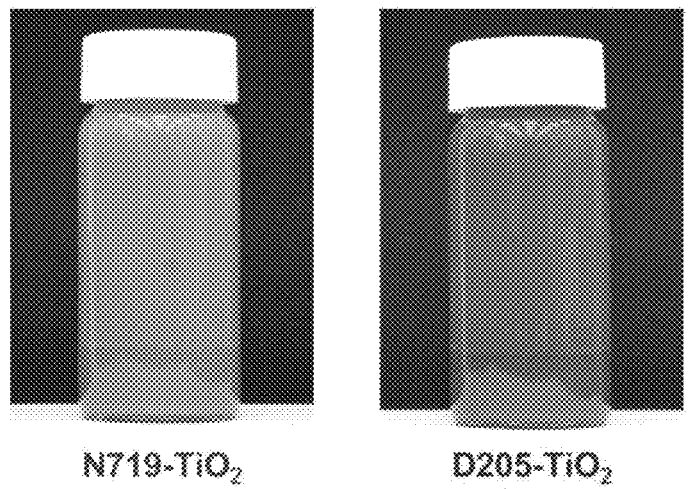

FIG. 16 is a photograph which shows the appearance of low temperature curable titanium dioxide paste containing dye of Examples 4 and 5 which have different types of dye.

Figure 17:
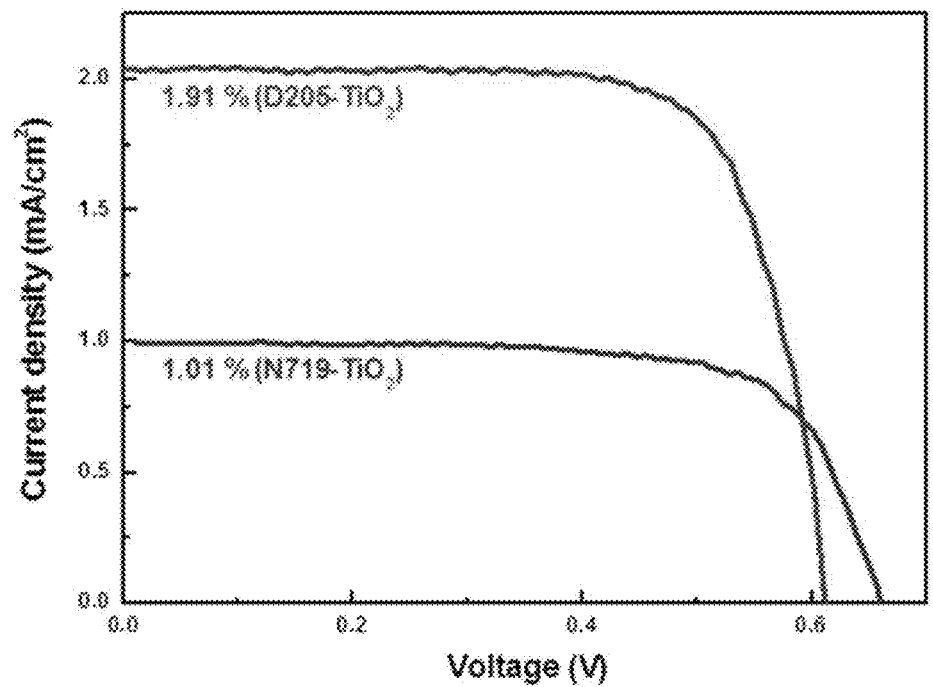

FIG. 17 represents the measurement results of energy conversion efficiency when titanium dioxide paste containing dye in Examples 4 and 5 was used.

Figure 18:
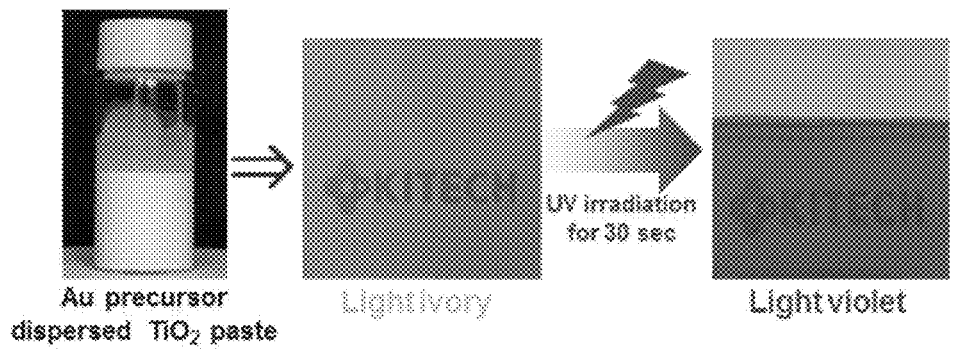

FIG. 18 is a photograph which shows a color change of coating surface before and after the UV irradiation after coating using titanium dioxide paste containing metal precursor in the present invention.

Figure 19:
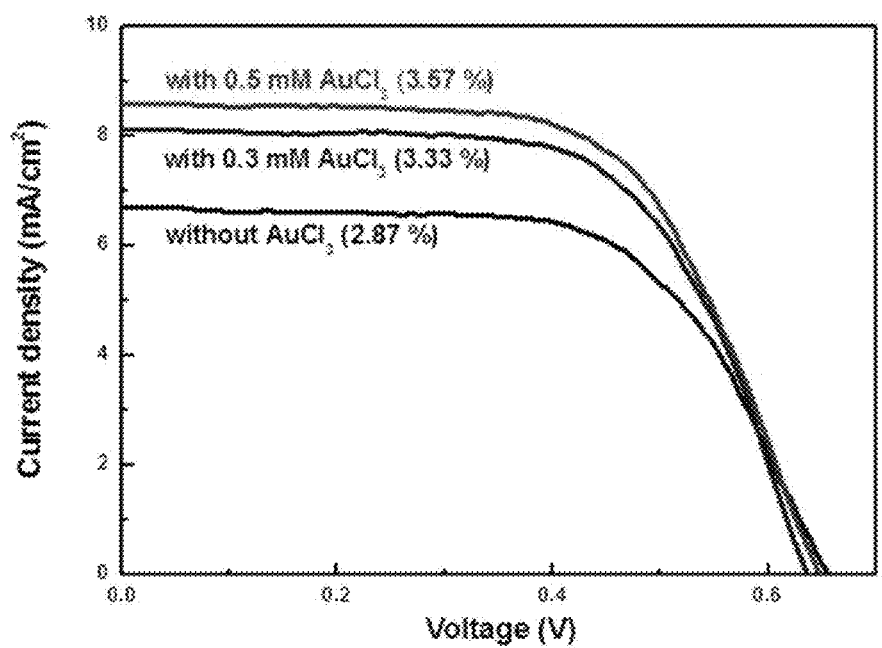

FIG. 19 represents the measurement results of energy conversion efficiency when titanium dioxide paste containing metal precursor in Examples 6 and 7, and Comparison Example 2 was used.

SPECIFIC EXAMPLES OF INVENTION

The configuration and effect of the present invention are described in more details through providing Examples as below. However, these Examples are merely meant to illustrate, but in no way to limit, the scope of the present invention.

Examples 1-3

Preparation of Low Temperature to Curable Titanium Dioxide Paste

Low temperature curable paste was prepared according to the composition in Table 1.

Specifically, mixed solvent was prepared by mixing ethanol and deionized water (D. I. Water) followed by stirring for 30 minutes.

After titanium dioxide nanoparticles (Degussa P25) were added to the mixed solvent, dispersed solution of titanium dioxide nanoparticle was prepared by repeating the process of treating with ultrasound of 20 kHz in thermostat container for 10 minutes followed by cooling for 2 minutes by 10 times.

Titanium dioxide paste was prepared by stirring for 5 hours to react after adding titanium isopropoxide (TIPP) to the dispersed solution of titanium dioxide nanoparticle while stirring.

TABLE 1

| Exam. No. | TIPP:P25 (molar ratio) | TIPP (g) | P25 (g) | Ethanol (g) | Deionized water (g) | Total amount (g) |
|---|---|---|---|---|---|---|
| Example 1 | 0.05:1 | 1.8 | 10 | 88 | 0.2 | 100 |
| Example 2 | 0.1:1 | 3.6 | 10 | 85.9 | 0.5 | 100 |
| Example 3 | 0.3:1 | 10.7 | 10 | 77.9 | 1.4 | 100 |

Comparison Example 1

Preparation of Titanium Dioxide Using General Stirring Method

Titanium dioxide paste by dispersing using general stirring method was prepared according to the same method as in Example 2, except preparing dispersed solution of titanium dioxide nanoparticles by stirring in thermostat container for 100 minutes instead of repeating the process of treating with ultrasound of 20 kHz in thermostat container for 10 minutes followed by cooling for 2 minutes by 10 times.

Experimental Example 1

Determination of Permeability of Titanium Dioxide Paste According to the Degree of Dispersion In order to determine permeability of titanium dioxide paste according to the degree of dispersion, the permeability of titanium dioxide paste prepared by ultrasonic dispersion method in the Example 2 was compared with the permeability of titanium dioxide paste prepared by dispersing using general stirring method in Comparison Example 1.

Figure 1:
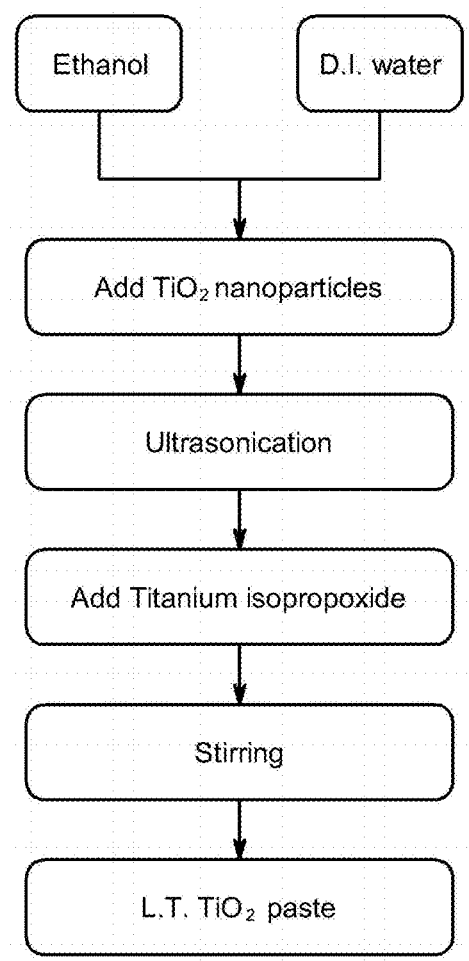
FIG. 1 is the flow diagram to represent the method for preparing titanium dioxide paste as one embodiment of the present invention.
Figure 2:
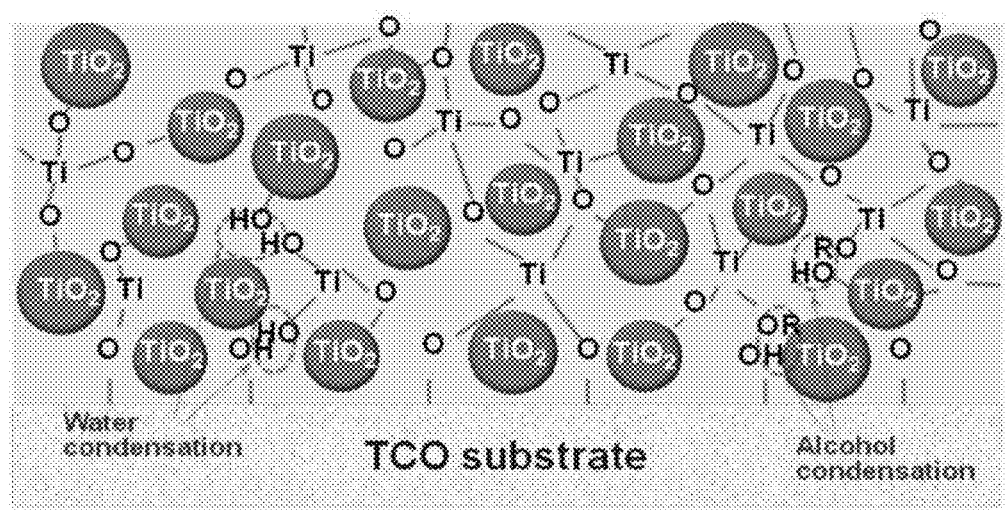
FIG. 2 illustrates schematically the process of formation of —O—Ti—O— network between titanium dioxide nanoparticle and titanium isopropoxide through hydrolysis and condensation reaction of titanium dioxide nanoparticle, titanium isopropoxide and water as represented by Reaction Equation 1.
Figure 3:
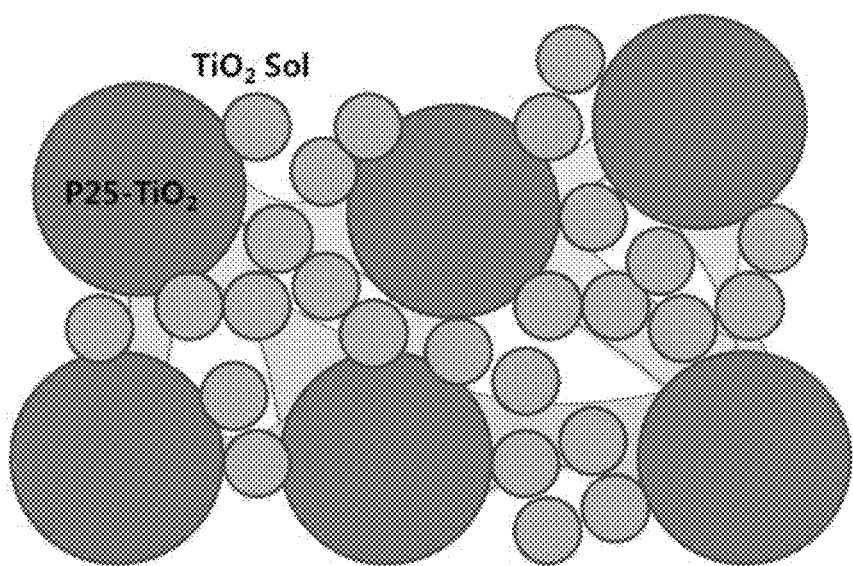
FIG. 3 illustrates schematically the microstructure of titanium dioxide coated layer of the electrode which is prepared using the above titanium dioxide paste.
Figure 4:
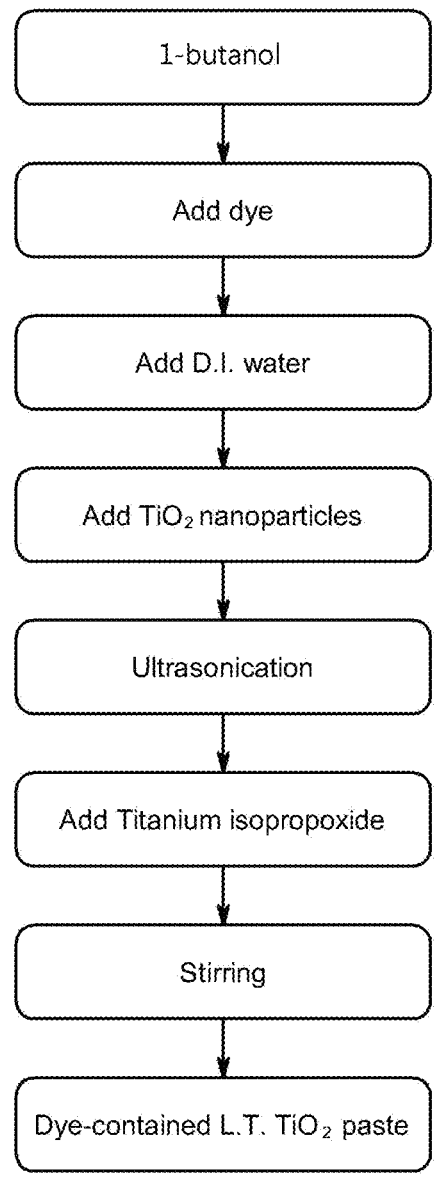
FIG. 4 is the flow diagram to illustrate each step of the method for preparing titanium paste containing dye for dye sensitized solar cell as one embodiment of the present invention.
Figure 5:
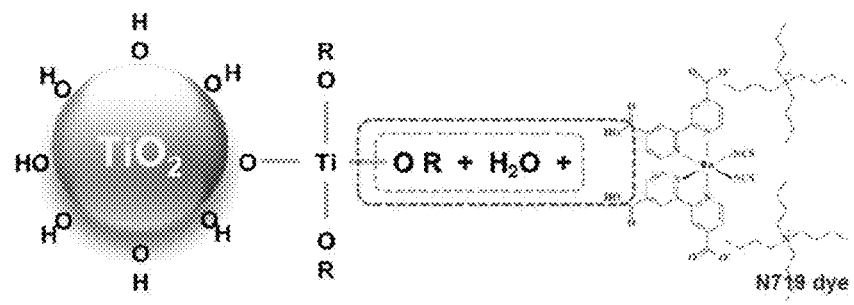
FIG. 5 illustrates schematically the process of formation of network of ruthenium-based organo-metallic compound dye by forming the chemical bond through condensation reaction of hydroxyl group of ruthenium-based organo-metallic compound dye with —O—Ti—O— network formed by titanium dioxide nanoparticle and titanium isopropoxide in titanium dioxide paste.
Figure 6:
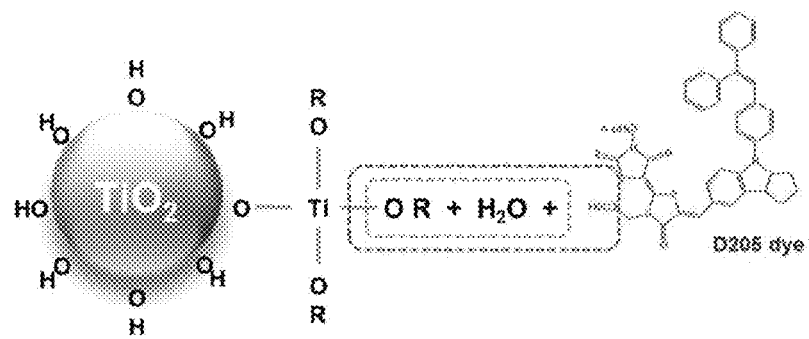
FIG. 6 illustrates schematically the process of formation of network of organic compound dye by forming the chemical bond through condensation reaction of carboxyl group of organic compound dye with —O—Ti—O— network formed by titanium dioxide nanoparticle and titanium isopropoxide in titanium dioxide paste.
Figure 7:
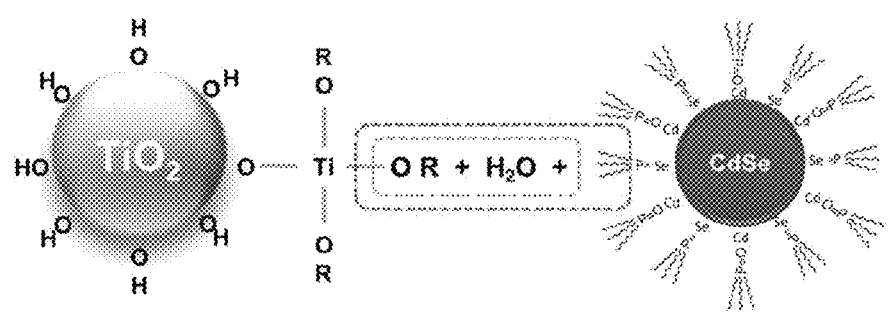
FIG. 7 illustrates schematically the process of formation of network of quantum dot inorganic compound dye by forming the chemical bond through condensation reaction of carboxyl radical of organic compound dye with —O—Ti—O— network formed by titanium dioxide nanoparticle and titanium isopropoxide in titanium dioxide paste.
Figure 8:
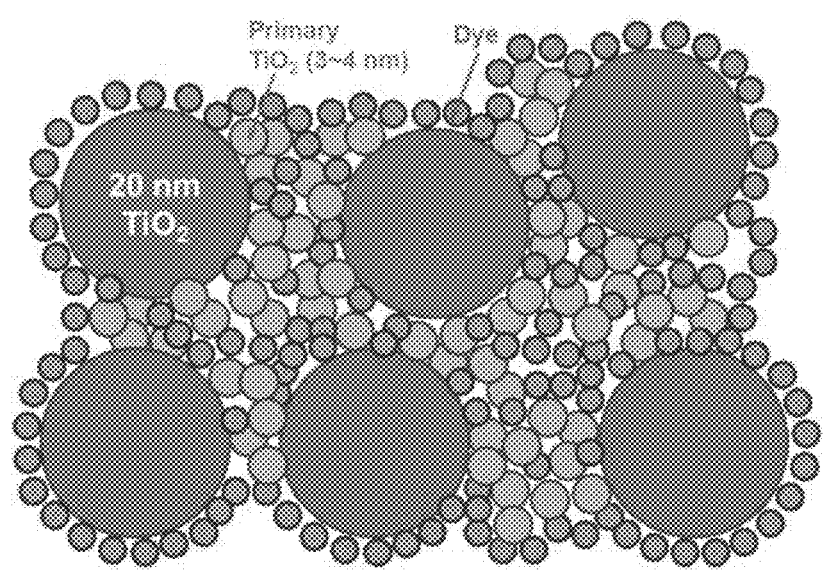
FIG. 8 illustrates schematically the microstructure of titanium dioxide coated layer of the electrode which is prepared using the above titanium dioxide paste containing dye.
Figure 9:
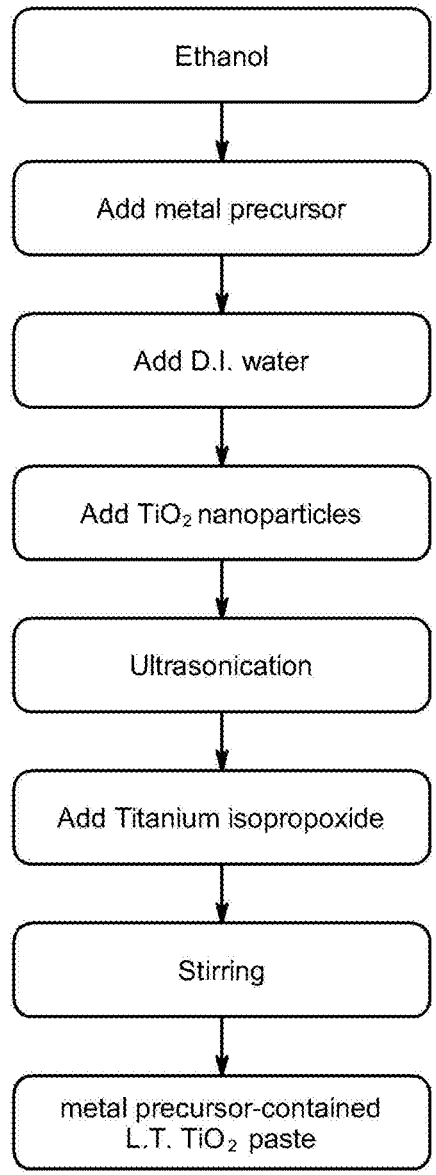
FIG. 9 is the flow diagram to illustrate each step of the method for preparing titanium paste containing metal precursor for dye sensitized solar cell as one embodiment of the present invention.
Figure 10:
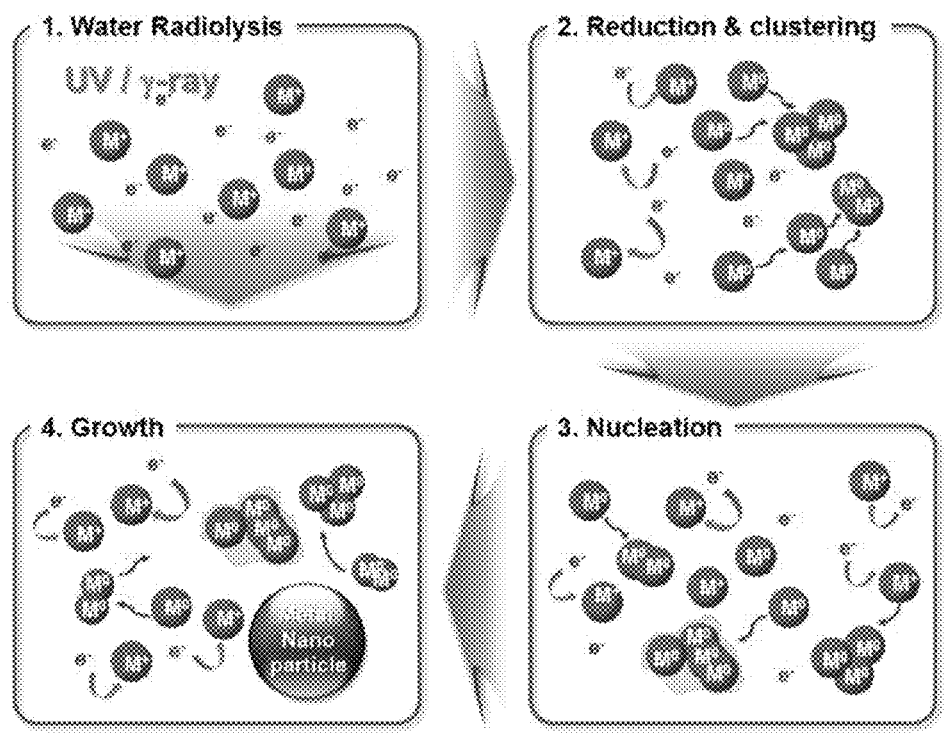
FIG. 10 is the schematic diagram to illustrate the process of growth reaction of metal precursor to metal nanoparticle in the present invention.
Figure 11:
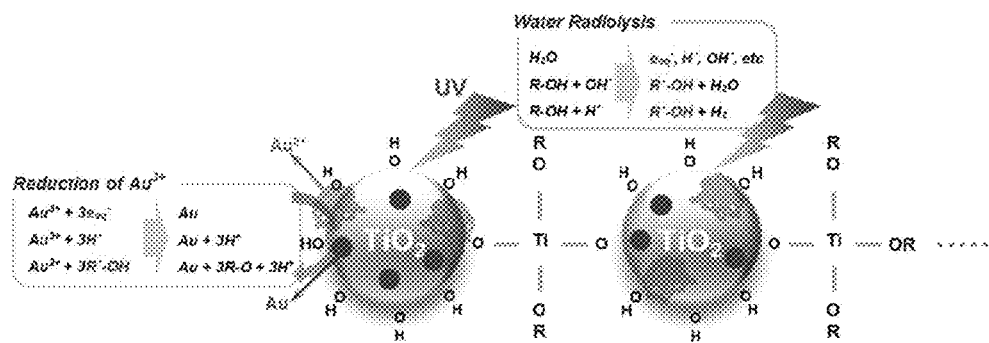
FIG. 11 is the schematic diagram to illustrates process of growth reaction of gold precursor, which is used as metal precursor in the present invention, to gold nanoparticle by combining the surface on titanium dioxide nanoparticle.
Figure 12:
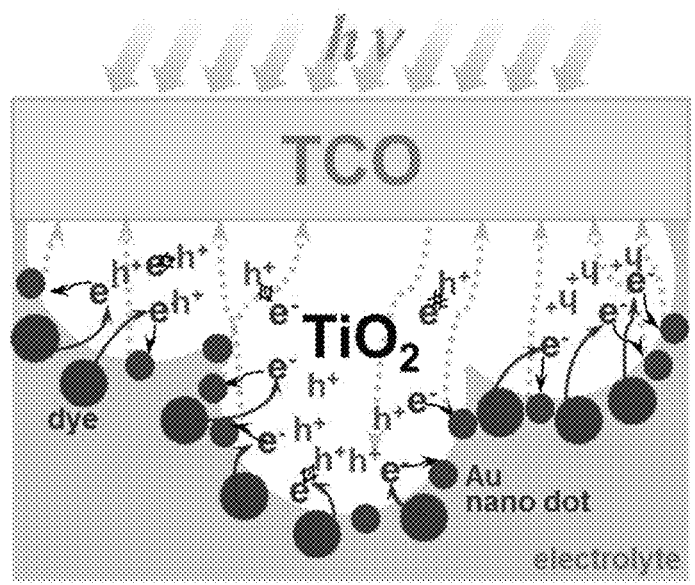
FIG. 12 represents the electron injection and recombination between metal nanoparticle and titanium dioxide nanoparticle.
Figure 13:
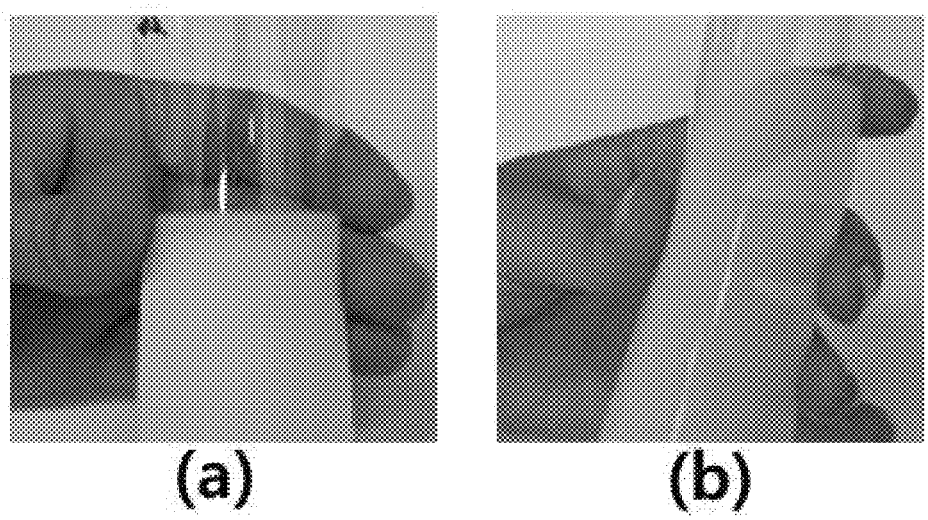
FIG. 13 shows the results of determining permeability of titanium dioxide paste according to the degree of dispersion.

The result is shown in FIG. 13. In FIG. 13, (a) represents titanium dioxide paste prepared by general dispersion method, and (b) represents titanium dioxide paste prepared by dispersing using ultrasonic stirring method.

As shown in FIG. 13, the permeability of titanium dioxide paste prepared by ultrasonic dispersion method is higher than that of titanium dioxide paste prepared by dispersing using general stirring method.

Experimental Example 2

Determination of Energy Conversion Efficiency of Titanium Dioxide Paste According to the Degree of Dispersion In order to determine energy conversion efficiency of titanium dioxide paste according to the degree of dispersion, after dye sensitized solar cells were prepared using titanium dioxide paste prepared by ultrasonic dispersion method in the Example 2 and titanium dioxide paste prepared by dispersing using general stirring method in Comparison Example 1, respectively, the energy conversion efficiency of each was compared to each other.

In order to prepare dye sensitized solar cell, separate ITO coated PEN substrate was dip coated with titanium dioxide paste in Example 2 and titanium dioxide paste by general stirring method, respectively in Comparison Example 1, and cured at 120° C. for 1 hour.

Dye impregnated unit cell was prepared by dipping the cured substrate in D205(2-((E)-5-(1,2,3,3a,4,8b-hexahydro-4-(4-(2.2-diphenylvinyl)phenyl)cyclopenta[b]indole-7-yl)methyl)-3-octyl-5-(3-carboxymethyl-4-oxo-thiazolidin-2-ylidene)rhodanine) (MITSUBIS, Japan) dye solution (butanol:acetonitrile, 1:1 (v/v), 0.3 mM) at room temperature for 2 hours, followed by washing with ethanol and drying at 60° C., and the energy conversion efficiency thereof was determined.

As the measurement results of energy conversion efficiency of the above cell, titanium dioxide paste in Example 2 exhibits energy conversion efficiency of 2.87%, and titanium dioxide paste in Comparison Example 1 exhibits energy conversion efficiency of 1.78%

Therefore, the results verified that dye sensitized solar cell with high energy conversion efficiency can be prepared using titanium dioxide paste prepared by ultrasonic dispersion method, compared with titanium dioxide paste prepared by dispersing using general stirring method.

Experimental Example 3

Examination of Surface of Titanium Dioxide Coating According to the Amount of Added TIPP In order to examine the surface of titanium dioxide coating according to the amount of added TIPP, appearances of coating surface using titanium dioxide paste of Example 1 to Example 3 were compared.

Specifically, titanium dioxide coating was formed by curing at 120° C. for 1 hour after dip coating ITO coated PEN substrate with titanium dioxide paste of Examples 1 to 3, respectively.

FIG. 14 represents the views of the surface of titanium dioxide coating and Observation results thereof with a scanning electron microscope (SEM). In FIG. 14, (a), (b) and (c) represent the surface of coating using titanium dioxide paste of Example 1, Example 2, and (c) Example 3, respectively.

As shown in FIG. 14, the case (a) exhibits inhomogeneous coating surface, desquamation phenomenon and local microfissure due to low viscosity and strong volatility of paste, the case (c) exhibits lots of micro-fissures on the surface due to intensified agglomeration phenomenon between nanoparticles and increased consolidation and the case (b) exhibits the most homogeneous condition of coating surface without micro-fissure.

Experimental Example 4

Determination of Energy Conversion Efficiency of Titanium Dioxide Paste According to the Substrate In order to determine energy conversion efficiency of titanium dioxide paste according to the substrate, after dye sensitized solar cells were prepared using glass substrate and PEN substrate, energy conversion efficiencies thereof were compared.

Paste in Example 2, which has the most stable composition, was used as titanium dioxide paste.

Glass substrate and PEN substrate were dip coated with the paste, and then cured at 120° C. for 1 hour.

Dye impregnated unit cell was prepared by dipping the cured substrate in D205(2-((E)-5-(1,2,3,3a,4,8b-hexahydro-4-(4-(2.2-diphenylvinyl)phenyl)cyclopenta[b]indole-7-yl) methyl)-3-octyl-5-(3-carboxymethyl-4-oxo-thiazolidin-2-ylidene)rhodanine) (MITSUBIS, Japan) the solution (butanol:acetonitrile, 1:1 (v/v), 0.3 mM) at room temperature for 2 hours, followed by washing with ethanol and drying at 60° C. and the energy conversion efficiency thereof was determined.

The measurement results of energy conversion efficiencies of the above cells were shown in FIG. 15.

As seen in FIG. 15, energy conversion efficiencies are 4.62% and 2.87% for glass substrate and PEN substrate, respectively.

Therefore, the results represent the relatively high energy conversion efficiency regardless of the type of substrate.

Example 4-5

Preparation of Low Temperature Curable Titanium Dioxide Paste Containing Dye

Low temperature curable titanium dioxide paste containing dye was prepared according to the composition in Table 2.

Specifically, dye solution was prepared by dissolving N719 (di-tetrabutylammonium cis-bis(isothiocyanato)bis(2,2'-bipyridyl-4,4'-dicarboxylato)ruthenium(II)) or D205 (2-((E)-5-(1,2,3,3a,4,8b-hexahydro-4-(4-(2.2-diphenylvinyl)phenyl)cyclopenta[b]indole-7-yl)methyl)-3-octyl-5-(3-carboxymethyl-4- oxo-thiazolidin-2-ylidene)rhodanine) dye in 1-butanol. Mixed solution was prepared by mixing deionized water (D. I. Water) to the dye solution followed by stirring for 30 minutes.

After titanium dioxide nanoparticles (Degussa P25) were added to the mixed solution, dispersed solution of titanium dioxide nanoparticle was prepared by repeating the process of treating with ultrasound of 20 kHz in thermostat container for 10 minutes followed by cooling for 2 minutes by 10 times.

Titanium dioxide paste was prepared by stirring for 5 hours to react after adding titanium isopropoxide (TIPP) to the dispersed solution of titanium dioxide nanoparticle while stirring.

TABLE 2

| Exam. No. | Type of dye/concentration (mM) | Dye (g) | TIPP:P25 (Molar ratio) | TIPP (g) | P25 (g) | 1-butanol (g) | Deionized water (g) | Total amount (g) |
|---|---|---|---|---|---|---|---|---|
| Example 4 | N719/3 | 0.4 | 0.1:1 | 3.6 | 10 | 85.5 | 0.5 | 100 |
| Example 5 | D205/3 | 0.3 | 0.1:1 | 3.6 | 10 | 85.6 | 0.5 | 100 |

Experimental Example 5

Examination of Status of Titanium Dioxide Paste Containing Dye in the Present Invention Appearances of low temperature curable titanium dioxide pastes containing dye in Examples 4 and 5 were shown in FIG. 16.

FIG. 16 identified that the low temperature curable paste containing dye in the present invention forms the stable phase.

Therefore, it is verified that the dye which the paste in the present invention contains can be stably present in the paste with primary titanium dioxide nanoparticle formed by titanium dioxide nanoparticle and titanium isopropoxide in titanium dioxide paste.

Experimental Example 6

Determination of Energy Conversion Efficiency of Titanium Dioxide Paste Containing Dye According to the Type of Dye In order to determine energy conversion efficiency of titanium dioxide paste containing dye according to the type of dye, after dye sensitized solar cells were prepared using titanium dioxide paste containing dye in Examples 4 to 5, the energy conversion efficiencies thereof were compared.

In order to prepare dye sensitized solar cell, after dye adsorbed electrode was prepared by curing at 120° C. for 1 hour after dip coating the separate ITO coated PEN substrate with titanium dioxide paste containing dye in Examples 4 to 5, respectively, the unit cell was prepared using the same and the energy conversion efficiency thereof was investigated.

The measurement results of energy conversion efficiency of the above cell identified that titanium dioxide paste containing dye in Example 4 exhibits a relatively low energy conversion efficiency of 1.01%. Also, it was identified that titanium dioxide paste containing dye in Examples 5 exhibits a relatively higher energy conversion efficiency of 1.91% than Example 4. Specifically, the measurement results of energy conversion efficiency when titanium dioxide pastes containing dye in Examples 4 and 5 were used were represented in FIG. 17.

Therefore, the results verified that energy conversion efficiency, when titanium dioxide paste containing dye was used, can be adjusted to the optimum by varying the type of dye.

Example 6-8

Preparation of Low Temperature Curable Titanium Dioxide Paste Containing Metal Precursor Low temperature curable paste was prepared according to the composition in Table 3.

Specifically, metal precursor solution was prepared by dissolving $AuCl_3$ as metal precursor in ethanol. Mixed solution was prepared by mixing deionized water (D. I. Water) to the metal precursor solution followed by stirring for 30 minutes.

After titanium dioxide nanoparticles (Degussa P25) were added to the mixed solution, dispersed solution of titanium dioxide nanoparticle was prepared by repeating the process of treating with ultrasound of 20 kHz in thermostat container for 10 minutes followed by cooling for 2 minutes by 10 times.

Titanium dioxide paste was prepared by stirring for 5 hours to react after adding titanium isopropoxide (TIPP) to the dispersed solution of titanium dioxide nanoparticle while stirring.

Comparison Example 2

Preparation of Low Temperature Curable Titanium Dioxide Paste Containing No Metal Precursor Titanium dioxide paste was prepared according to the same method as in Example 6, except that the paste did not contain metal precursor.

In this case, titanium dioxide paste of 100 g in total was prepared by adjusting the amount of ethanol.

Experimental Example 7

Examination of Color Change of Coating Surface by UV Irradiation after Coating Using Titanium Dioxide Paste Containing Metal Precursor in the Present Invention Change of coating surface by UV irradiation was investigated after coating the substrate with low temperature curable titanium dioxide paste containing metal precursor in Example 8.

Specifically, after dip coating the ITO coated substrate with titanium dioxide paste containing metal precursor in Example 8, UV irradiation was performed for 30 seconds.

Appearances of coating surface before and after the UV irradiation after coating using titanium dioxide paste containing metal precursor were represented in FIG. 18.

FIG. 18 identified that the color of coating layer formed by low temperature curable titanium dioxide paste containing metal precursor in the present invention is changed by UV irradiation. This color change indicates gold (Au) precursor, which is metal precursor in the coating layer, was reduced to grow into gold (Au) nanoparticle.

Experimental Example 8

Determination of Energy Conversion Efficiency of Titanium Dioxide Paste Containing Meal Precursor According to the Content of Metal Precursor In order to determine energy conversion efficiency of titanium dioxide paste containing meal precursor according to the content of metal precursor, after dye sensitized solar cells were prepared using titanium dioxide paste containing metal precursor in Examples 6 to 8 and titanium dioxide paste containing no metal precursor in Comparison Example 2, the energy conversion efficiencies thereof were compared.

In order to prepare dye sensitized solar cell, after dip coating the separate ITO coated PEN substrate with titanium dioxide paste containing metal precursor in Examples 6 to 8 and titanium dioxide paste containing no metal precursor in Comparison Example 2, respectively, UV irradiation was performed for 30 seconds. Then, the UV treated substrate was cured at 120° C. for 1 hour.

TABLE 3

| Exam. No. | Concentration of $AuCl_3$ (mM) | $AuCl_3$ (g) | TIPP:P25 (molar ratio) | TIPP (g) | P25 (g) | Ethanol (g) | Deionized water (g) | Total amount (g) |
|---|---|---|---|---|---|---|---|---|
| Example 6 | 0.3 | 0.009 | 0.1:1 | 3.6 | 10 | 85.891 | 0.5 | 100 |
| Example 7 | 0.5 | 0.015 | 0.1:1 | 3.6 | 10 | 85.885 | 0.5 | 100 |
| Example 8 | 12 | 0.36 | 0.1:1 | 3.6 | 10 | 85.54 | 0.5 | 100 |

Dye impregnated unit cell was prepared by dipping the cured substrate in N719 (di-tetrabutylammonium cis-bis(isothiocyanato)bis(2,2'-bipyridyl-4,4'-dicarboxylato)ruthenium(II)) dye solution (Butanol:Acetonitrile (V:V=1:1), 0.3 mM) at room temperature for 24 hours, followed by washing with ethanol and drying at 60° C., and the energy conversion efficiency thereof was investigated.

The measurement results of energy conversion efficiency of the above cell identified that titanium dioxide pastes containing metal precursor in Examples 6 and 7 exhibit improved energy conversion efficiency of 3.33% and 3.57%, respectively, compared that titanium dioxide paste containing no metal precursor in Comparison Example 2 exhibits energy conversion efficiency of 2.87%. However, when titanium dioxide paste containing metal precursor in Example 8 was used, the measurement couldn't be done due to a short circuit by excessive growth of gold (Au) nanoparticle resulted from too high metal precursor content. Specifically, the measurement results of energy conversion efficiency when titanium dioxide pastes containing metal precursor in Examples 6 and 7, and Comparison Example 2 were used were represented in FIG. 19.

The results verified that energy conversion efficiency can be adjusted to the optimum by controlling the concentration of metal precursor within the certain extent.

The invention claimed is:

1. A method for preparing a titanium dioxide paste, comprising steps of:
    adding a titanium dioxide nanoparticle to water, alcohol, or a mixed solvent thereof (Step 1);
    dispersing the resultant mixture formed in Step 1 with ultrasound (Step 2);
    adding a titanium dioxide precursor to the dispersed solution formed in Step 2 (Step 3); and
    stirring the resultant mixture formed in Step 3 (Step 4).

2. The preparation method according to claim 1, wherein a dye or a metal precursor is also added in Step 1.

3. The preparation method according to claim 2, wherein a dye is added in Step 1 and Step 1 comprises the steps of:
    preparing a dye solution by dissolving the dye in alcohol (Step a1);
    preparing a mixed solution by adding water to the dye solution (Step b1); and
    adding a titanium dioxide nanoparticle to the mixed solution (Step c1).

4. The preparation method according to claim 2, wherein a metal precursor is added in Step 1 and Step 1 comprises the steps of:
    preparing a metal precursor solution by dissolving a metal precursor in alcohol (Step a2);
    preparing a mixed solution by adding water to the metal precursor solution (Step b2); and
    adding a titanium dioxide nanoparticle to the mixed solution (Step c2).

5. The preparation method according to claim 2, wherein the dye is a ruthenium-based organo-metallic compound selected from the group consisting of N3, N749, and Z907; an organic compound selected from the group consisting of coumarin, porphyrin, xanthine, riboflavin, triphenyl methane, D205, NKX-2311, and NKX-2677; or a quantum dot inorganic compound selected from the group consisting of InP, CdSe, CdS, CdTe, PbS, and PbSe.

6. The preparation method according to claim 2, wherein the concentration of the dye is 0.3 to 3 mM.

7. The preparation method according to claim 2, wherein the metal precursor is gold (Au), platinum (Pt), or palladium (Pd).

8. The preparation method according to claim 2, wherein the concentration of the metal precursor is 0.3 to 10 mM.

9. The preparation method according to claim 1, wherein the alcohol is ethanol, methanol, propanol, or butanol.

10. The preparation method according to claim 1, wherein the amount of the titanium dioxide nanoparticle is 7 to 13% of the total amount of the titanium dioxide paste by weight.

11. The preparation method according to claim 1, wherein Step 2 is performed by repeating 5 to 15 times the process of ultrasonic treatment of the resultant mixture formed in Step 1 for 5-15 minutes followed by cooling for 1-5 minutes.

12. The preparation method according to claim 1, wherein the titanium dioxide precursor is titanium alkoxide, titanium chloride ($TiCl_4$), or a combination thereof.

13. The preparation method according to claim 12, wherein the titanium alkoxide is titanium isopropoxide (TIPP), titanium methoxide, titanium ethoxide, titanium tetrabutoxide, titanium tetra-isobutoxide, titanium tetra-tert butoxide, or a combination thereof.

14. The preparation method according to claim 1, wherein the amount of the titanium dioxide precursor is 0.05 to 0.2 mol per 1 mol of the titanium dioxide nanoparticle.

15. The preparation method according to claim 1, wherein the amount of water is 2 to 4 mol per 1 mol of the titanium dioxide precursor.

16. The preparation method according to claim 1, wherein of Step 4 is performed for 3 to 7 hours.

17. A titanium dioxide paste prepared by the method of claim 1.

18. The titanium dioxide paste according to claim 17, wherein the titanium dioxide paste is used for a dye sensitized solar cell.

19. A method for preparing an electrode for a dye sensitized solar cell, comprising steps of:
    preparing an electrode-treated substrate (Step 1);
    coating the top of the electrode with a titanium dioxide paste of claim 17 (Step 2);
    forming a titanium dioxide layer by curing the coated substrate at 100 to 140° C. (Step 3); and
    adsorbing dye on the titanium dioxide layer (Step 4).

20. A method for preparing an electrode for a dye sensitized solar cell, comprising steps of:
    preparing a dye solution by dissolving dye in alcohol;
    preparing a mixed solution by adding water to the dye solution;
    adding a titanium dioxide nanoparticle to the mixed solution to form a first mixture;
    dispersing the first mixture with ultrasound;
    adding a titanium dioxide precursor to the dispersed solution to form a second mixture;
    stirring the second mixture to form titanium dioxide paste;
    preparing an electrode-treated substrate;
    coating the top of the electrode with the titanium dioxide paste; and
    forming a titanium dioxide layer by curing the coated substrate at 100° C. to 140° C.

21. A method for preparing an electrode for a dye sensitized solar cell, comprising steps of:
    preparing a metal precursor solution by dissolving the metal precursor in alcohol;
    preparing a mixed solution by adding water to the metal precursor solution;
    adding a titanium dioxide nanoparticle to the mixed solution to form a first mixture;
    dispersing the first mixture with ultrasound;
    adding a titanium dioxide precursor to the dispersed solution to form a second mixture;

stirring the second mixture to form titanium dioxide paste;
preparing an electrode-treated substrate;
coating the top of the electrode with the titanium dioxide paste;
forming a titanium dioxide layer by curing the coated substrate at 100° C. to 140° C.; and
adsorbing dye on the titanium dioxide layer.

22. The preparation method according to claim 21, further comprising a step of reducing the metal precursor to a metal after coating the top of the electrode with the titanium dioxide paste.

* * * * *